May 5, 1959
E. N. MORTENSON
2,885,279
PLANT FOOD MANUFACTURE
Filed April 16, 1954
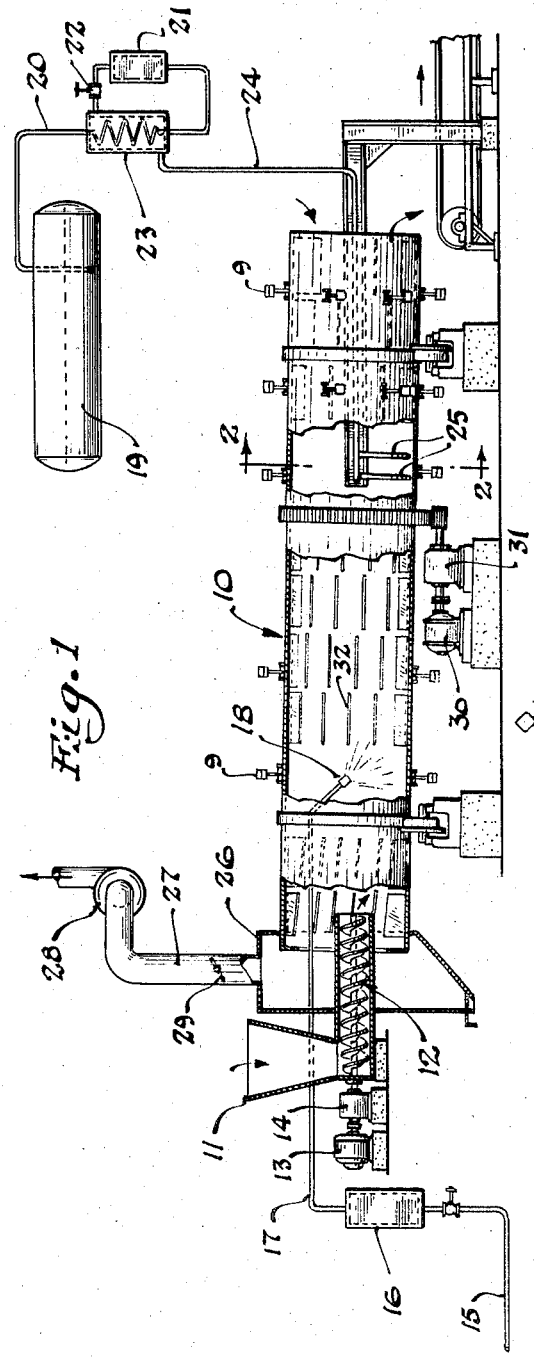
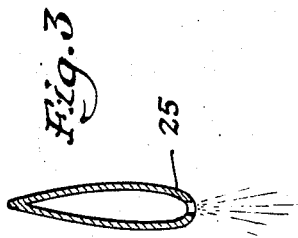
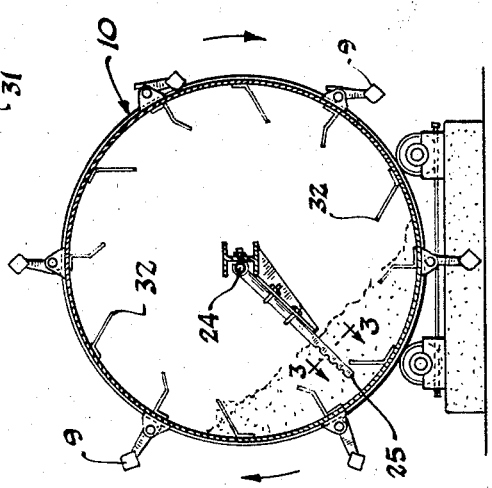
INVENTOR.
Everett N. Mortenson
BY
R. G. Story
ATTORNEY

United States Patent Office 2,885,279
Patented May 5, 1959

2,885,279

PLANT FOOD MANUFACTURE

Everett N. Mortenson, Chicago, Ill., assignor to Swift & Company, Chicago, Ill., a corporation of Illinois Application April 16, 1954, Serial No. 423,753

5 Claims. (Cl. 71—42)

This invention relates in general to the continuous manufacture of fertilizers. More particularly, the invention concerns a process wherein mineral acids and alkalies are reacted within or in the presence of carriers such as solid fertilizer ingredients of the superphosphate type.

Superphosphates and similar solid fertilizer ingredients are generally treated with a nitrogen-containing substance to furnish a source of fixed nitrogen within the fertilizer.

A nitrogen-containing salt may advantageously be formed while the additional fertilizer solids are being mixed, generally in an inclined rotary shell. A suitable acid, sulfuric, nitric or phosphoric, is comingled with an ammoniacal substance in the presence of the tumbling solids. The process is termed "in situ" ammonium salt formation.

"In situ" salt formation as generally carried out has one particularly serious limitation. A reaction of the acid-alkali type is strongly exothermic. For example, when one pound mol of sulfuric acid reacts with two pound mols of ammonia, liquid or gaseous, over 100,000 British thermal units (B.t.u.) of heat are liberated. One hundred pounds of "in situ" ammonium sulfate, sufficient to provide 1% nitrogen as N per ton of plant food requires 96 lbs. of 60° Bé. sulfuric acid (77.67% $H_2SO_4$) and 25.7 lbs. ammonia. The ensuing reaction will liberate somewhat over 76,700 B.t.u.'s of heat. When nitric or phosphoric acids are selected rather than sulfuric, the reaction is similarly violently exothermic. If the resultant product is stored away in curing piles while still hot, the superphosphate will have an excessive portion of its soluble or available form reverted to the unavailable or insoluble forms, a phenomenon which is further discussed below. Also, when ammoniated superphosphates are bagged or stored hot, they cake far more readily than if first cooled.

Solid matter cooling in the mixed fertilizer industry generally involves charging the freshly mixed hot goods into a cooling unit through which passes a current of air. Excess water in the solids flash evaporates as long as the temperature remains above the boiling points of the saturated aqueous solutions of any of the salts present, carrying with it 970.3 B.t.u./lb. In addition to sweeping along the vaporized moisture, the cool air stream itself picks up a certain amount of heat. However, when the product temperature drops below the aforementioned boiling point levels, vaporization of the water proceeds slowly and the air stream must be largely relied upon to further the cooling if a dry product having little propensity to cake is desired. It is apparent that since a finished solids temperature of at least 100° to 120° F. is necessary if reversion of the superphosphate is to be avoided, the cool air treatment period must be substantial.

The undesirable reversion referred to is the phenomenon involving the reaction of the ammonium citrate-soluble (available) calcium phosphate present in ammoniated superphosphates with ammonia or similar alkaline material to yield citrate-insoluble (unavailable) tricalcium phosphate. This reaction proceeds slowly throughout the time the product is in storage being cured, provided that relatively high heat and moisture levels are maintained.

Attempts to more rapidly reduce the product temperature during and immediately following ammonium salt formation have involved the use of liquid anhydrous ammonia which vaporizes at —28° F. at atmospheric pressure rather than the usual gaseous or aqua ammonia. In both batch and continuous processes, the liquid anhydrous is simply introduced concurrently with the acid. If liquid anhydrous is to be effective as a cooling agent when employed in this fashion, a large excess over that actually consumed in the reaction is required, for the heat abstracted by vaporizing liquid anhydrous ammonia, 17,612 B.t.u. per two pound mol, is for example, less than one sixth that evolved, 118,872 B.t.u.'s, when that same two pound mols react with acid to form ammonium sulfate. Similar conditions obtain when ammonium nitrate or ammonium phosphate are produced. The excess vaporized ammonia must be removed from the reaction chamber and absorbed in a dilute acid or water or otherwise disposed of.

It is evident therefore, that unless ammonium salt formation is to be carried out over an extended time period, a large excess of liquid anhydrous must ordinarily be employed over and above the stoichiometric requirements if the product emerging at the discharge end of the rotary mixing shell is to be both dry and at a temperature substantially below 212° F.

It is therefore an object of this invention to provide a rapid "in situ" ammonium salt formation method which, while resulting in a cool, dry product requires the use of no more than stoichiometric quantities of ammonia.

A further object of this invention is to provide a fixed-nitrogen supplying method involving "in situ" ammonium salt formation which yields a product sufficiently cool and dry to resist caking and the ammoniated superphosphates of which have no tendency to revert to neutral ammonium citrate-insoluble or unavailable forms.

Another object of this invention is to utilize fully the heat-abstracting abilities of both water and liquid anhydrous ammonia in mixed granular fertilizer manufacture.

Additional objects and advantages of this invention will become apparent during the course of the description below.

Broadly, the invention comprises feeding continuous streams of solids and mineral acids or solids and partially neutralized acids such as sulfuric acid along with water if necessary into a rotating inclined tube while simultaneously introducing in countercurrent fashion a stream of liquid anhydrous ammonia. Stoichiometric quantities of liquid ammonia to neutralize substantially entirely the acid materials present are sprayed onto the solid material in the vicinity of the tube's discharge end. A stream of air serves to carry the ammonia vapors to the upper end of the cylindrical mixer at which point they contact the incoming acid-wetted solids and are absorbed, thereby evolving considerable exothermic heat. In the abence of a cooling medium at this point, the reactants, the reaction products and everything in the surrounding reaction zone are rapidly heated to a high temperature. So as to avoid this effect, the heat abstracting properties of water undergoing flash evaporation are taken advantage of. By simply adding the proper amount of water, the temperature level in the reaction zone may be held at a point corresponding closely to but always slightly above the boiling point of the saturated solution of the salt being formed. In the case of ammonium sulfate, for example, this is 227.3° F. The incoming liquid anhydrous ammonia at the lower end then completes the job, reducing the solids' temperature substantially below the level of the material in the reaction zone. It is seen that cooling, as contemplated by the instant invention is essentially a step-wise operation.

A complete understanding of the invention may be gained by reference to the following description and accompanying drawings which together disclose the individual features and combinations thereof, both as to the apparatus and the process, which constitute the essential novelty.

In the drawings:

Figure 1 represents a diagrammatic horizontal section of one form of apparatus used to carry out the process of this invention.

Figure 2 is a view into the rotary mixing shell taken on the line 2—2 of Figure 1 showing the flights located about the interior of the mixer.

Figure 3 is a sectional view of the end portion of claw 25 taken on line 3—3 of Figure 2.

Referring particularly to Figure 1, superphosphates or similar fertilizer solids are charged into mixer 10 through surge hopper 11 having a screw discharge conveyor 12 operated by a motor 13. A variable speed drive arrangement 14 can be set to maintain the desired uniform delivery of fertilizer solids to the mixer.

A valved line 15 connects an acid reservoir, not shown, with rotameter 16. This in turn is joined by line 17 to nozzle 18.

At the discharge end of the mixer 10 a liquid ammonia supply tank 19 is joined by means of submerged take-off line 20 to rotameter 21. Throttling valve 22 is placed between the rotameter and heat exchanger 23 surrounding the line 20. Line 24 provides communication between the heat exchanger and steel claws 25.

Enclosing the inlet end of the mixer 10 is a breeching box 26 connected by a duct 27 to exhaust fan 28. The duct is fitted with an adjustable damper 29. Finally, the mixer is provided with means for rotation. A motor 30 and gear drive arrangement 31 are illustrated. Suitable water injection means may be provided at the inlet end of the mixer. However, it is preferred simply to allow dilute acids or pre-moistened solids to supply the necessary water.

Referring to Figure 2, the interior of the mixing shell, viewed here from a point a short distance from the inlet end across line 2—2 of Figure 1, is equipped with suitable flights 32 which lift and cascade the solids so as to insure complete mixing and even cooling. Preferably, these flights are relatively short, 1 to 2 feet, and have serrated edges so as to properly shower the solid matter. They are most effective when each row is offset slightly from the one preceding. Such flights begin just following the point of acid injection and terminate just short of the liquid ammonia discharge claw 25. The inlet end of the rotary mixer is also equipped with forwarding flights. Their function is to rapidly move the solid material toward the interior of the tube so as to prevent its piling up and spilling into the bottom of the breeching box 26. These flights should be relatively long, 5 to 8 feet, and should be arranged in spiral fashion about the tube interior.

In operation, superphosphate or similar fertilizer solids material is introduced into mixer or kiln 10 through surge hopper 11 and screw discharge conveyor 12 projecting into the mixer. By means of motor 13 and variable speed drive mechanism 14 a uniform rate of solids delivery is maintained. The mixer flights of Figure 2 lift and shower the solids while aiding their forward motion in the inclined rotary mixer. Preferably, sulfuric acid, generally 60° Bé. (77.67% H₂SO₄) passes from a reservoir via valved line 15 through rotameter 16 to line 17 and finally to nozzle 18. Under certain circumstances it may be preferable to introduce acid ammonium sulfate at this point. Such acid sulfate may be formed in a reactor device of the type disclosed in copending application Serial Number 318,368, filed November 3, 1952, now Patent No. 2,755,176, and may be introduced either alone or together with additional acid material. Shell knockers 9 are about the exterior of the kiln at this point to obviate caking difficulties. The acid flow rate is, of course, a function of the amount of fixed nitrogen desired in the final product. For example, to supply one ton of solids with 1% available nitrogen, 100 pounds of ammonium sulfate are necessary as commercial ammonium sulfate carries only a little over 20% available nitrogen. Consequently, 96 pounds of 60° Bé acid (77.67% H₂SO₄) must be neutralized by 25.7 pounds of ammonia. The requisite liquid anhydrous ammonia passes from tank 19 via submerged take-off line 20 to rotameter 21. The valve 22 governs the flow to heat exchanger 23. At this point the liquid anhydrous begins to expand due to the reduced pressure within the heat exchanger. In so doing, it slightly prechills (5–10°) the liquid anhydrous flowing to the rotameter and thereby eliminates flashing in the line 20. In passing through line 24 to claws 25, the ammonia further expands and changes from a liquid at 60° F. and 92.9 p.s.i.g. to a cold vapor and liquid mixture in equilibrium at 0 p.s.i.g. Finally it emerges into mixer 10. The quantity of liquid flashing to vapor depends upon the amount of heat which can be abstracted from the total liquid—this heat serving to satisfy the latent heat of vaporization requirements of the vaporizing portion. The following formula provides a method of calculating the amount of liquid vaporized.

$$\text{Percent vaporized} = \frac{H_b - H_f}{V_f} \times 100$$

where:

$H_b$ is heat of liquid at higher or tank pressure, B.t.u./lb.;

$H_f$ is heat of liquid at lower or flashing pressure, B.t.u./lb.;

$V_f$ is latent heat of vaporization at lower or flash pressure, B.t.u./lb.

Since the heat of liquid anhydrous ammonia is 109.2 B.t.u./lb. at the tank pressure (temperature 60° F.) and 12.8 B.t.u./lb. at atmospheric pressure (temperature −28° F.) and as the latent heat of vaporization requirement of liquid anhydrous is 589.3 B.t.u./lb. at −28° F., the relation becomes:

$$\text{Percent vaporized} = \frac{109.2 - 12.8}{589} \times 100 = 16.35\%$$

It is seen that 16.35% of the liquid ammonia leaving claws 25 flashes to a vapor immediately. The 83.65% remaining is dispersed in the fertilizer solids as liquid anhydrous ammonia at −28° F. Each pound of unvaporized ammonia so admixed abstracts 589.3 B.t.u.'s from the hot solid material as it subsequently vaporizes.

Ammonia vapor, both that flashed immediately on release through claws 25 and that subsequently vaporized, is carried by a current of air entering the discharge end of the mixer. The velocity of this air is held at 25 to 150 feet per minute in a direction countercurrent to the solids travel. At the charging end of the mixer the ammonia vapor contacts and neutralizes the incoming sulfuric acid to form ammonium sulfate. The scrubbed air passes through the breeching box 26 and upwardly through duct 27 with the aid of exhaust fan 28. As indicated above, damper 29 is adjusted to maintain the air flow rate in the rotary inclined mixing tube at a velocity of from 25 to 150 feet per minute as related to the full cross section of the mixing tube. Maximum air flow is reached at the point at which excessive dust is swept along with the air.

The effectiveness of this process in yielding cool dry fertilizer materials is due to its ability to render available for use the entire cooling potential of both water and liquid anhydrous ammonia. This is accomplished by cooling in stages rather than simultaneously introducing the liquid anhydrous and water at a single point in the kiln. The water may be separately sprayed into the reaction zone, may be added to the fertilizer solids before they are placed in the kiln or preferably, as outlined above, may simply be admixed with the acid used. Such water is present in quantities just sufficient to reduce the solids temperature to 220–230° F. More will lower the temperature to a point below that at which water vaporizes and the result will be a cool but excessively wet product. Therefore, when it is no longer possible to advantageously employ water, the job of further cooling the fertilizer solids is taken over by the lower boiling ammonia. None of the cooling potential of liquid anhydrous is unnecessarily expended through contact with solids warmer than about 230° F. It has been found that when a 1% available-nitrogen superphosphate fertilizer is desired, the water present in 60° Bé. sulfuric acid is sufficient to maintain the solids within the 220–230° F. range. Varying the amount of nitrogen to be incorporated will, of course, change somewhat the quantity of water required.

The process of this invention is particularly effective where fertilizer solids of the superphosphate type are employed because superphosphates may themselves be ammoniated to some degree so as to serve as nitrogen bearers. For example, in the case of single superphosphate, the constituents phosphoric acid and monocalcium phosphate $(CaH_4(PO_4)_2)$ react with ammonia to yield mono-ammonium phosphate and dicalcium phosphate. On further treatment with ammonia below 167° F., mono-ammonium phosphate can be converted to diammonium phosphate, a substantial reservoir of available nitrogen. However, diammonium phosphate formation has been attended with difficulty as it could not exist at temperatures generally prevailing within a mixing shell. It was necessary to wait until a time or place remote from the initial acid-alkali interaction to avoid the presence of excessively hot materials before treating the superphosphate to secure the desired diammonium phosphate. The present invention makes possible the attainment of temperatures below 167° F. immediately following diammonium phosphate formation, at which time mixing and granulation are still in progress. Heretofore, this inability to reduce the product temperature to 167° F. or below immediately following neutralization has limited superphosphate ammoniation to about 3 pounds excess $NH_3$ per 20 pounds available $P_2O_5$ in the super, as supplementary ammoniation operations subsequent to product cooling have generally been dismissed as impractical or uneconomical. Now, however, by employing countercurrent continuous ammoniation with liquid anhydrous, the amount of neutralizing ammonia per 20 pounds available $P_2O_5$ can be boosted to a substantially higher amount, i.e., 4 to 6 pounds. Further, the undesirable reversion of the available dicalcium phosphate to the unavailable tricalcium phosphate during curing is eliminated, as the ammoniated product is neither sufficiently hot nor moist to support the reversion reaction.

Results of four comparative test runs using a pilot plant mixer having a one foot diameter, a length of eleven feet and rotating at 26 rotations per minute appear below. Two of the runs were made in the conventional fashion—acid and liquid anhydrous ammonia were introduced at the uppermost end of the inclined mixer so as to flow toward the outlet end in concurrent fashion. In the remaining two runs, acid and solid material were charged into the shell at the uppermost end while liquid anhydrous ammonia entered near the point of product discharge by means of the claws described above. Consequently, the flow of acid and alkali was in countercurrent fashion. In these last-mentioned runs, the induced draft of air was at a rate of 100 feet per minute maximum and was maintained at a temperature of about 75° F. and a relative humidity of about 40%.

| Type Run | Feed Rates and Temperatures | | | Product | |
|---|---|---|---|---|---|
| | lbs./min., 20% available phosphate super | GMS/min., 60° Bé., acid | GMS/min., liq. $NH_3$ | Moisture, percent | Temp., °F. |
| Concurrent | 5.1 | 124 | 102.6 | 5.04 | 162 |
| Countercurrent | 5.1 | 124 | 102.6 | 2.70 | 115 |
| Concurrent | 5.1 | 265.5 | 141 | 4.95 | 190 |
| Countercurrent | 5.1 | 265.5 | 141 | 2.30 | 100 |

The time required for passage of the solid material through the mixer was in the neighborhood of 5½ minutes in each case. The hold-up or retention time for commercial operations may be readily determined by well-known methods using the kiln rotation rate, slope, etc. In accordance with the process of this invention the ammonium sulfate formed in the first zone wherein water alone was used to abstract heat was reduced to a temperature in the neighborhood of 220–230° F. as previously explained. On emerging from the discharge end of the mixer, however, the temperature of the salt material had been reduced when the method of this invention (countercurrent) was employed to 115° and 100° F., respectively. As can be seen in the results above, the conventional (concurrent) method resulted in a product having temperatures of 162° and 190°, respectively. Any temperature lowering effect obtained in the conventional process was due to the use of water and liquid anhydrous ammonia in admixture together with the ordinarily encountered heat losses due to convection, conduction and radiation. The point of this invention is amply illustrated in these results for it is readily seen that by using the countercurrent method, involving sequential use of water and liquid anhydrous to cool, the temperature of the emerging solids is substantially below that which can be obtained in the conventional method. To be within the scope of this invention, therefore, sufficient cooling must be effected by the action of the liquid anhydrous ammonia alone to produce a substantial decrease in the heat of the product over that which prevails when the latter nears the liquid anhydrous injection zone. Otherwise there would obviously be no advantage in using this novel procedure. The conventional method would serve just as well. Therefore, by a "substantial" decrease in the temperature of the emerging product resulting solely from the use of liquid anhydrous ammonia it is intended to include not incidental reductions of a few degrees, but rather those of generally the type obtained in the tests described above. A temperature drop from the level of a boiling aqueous solution to a level of about the 100° to 120° F. set forth earlier in the specification is preferred, but obviously is not limiting as the exact amount of cooling obtained by use of the liquid anhydrous ammonia may vary over a wide range dependent upon the amount of heat loss resulting from conduction, convection, etc.; these latter factors being governed by speed of transient through the tube, tube length and diameter, ambient temperatures and other considerations recognized by those in the fertilizer industry.

Further tests were conducted with the apparatus described in which complete mixed goods were formulated having a grade of 10–10–10. That is, the product contained 10% N, 10% available $P_2O_5$ and 10% $K_2O$. This is a commonly used commercial grade. The formula used in each case is set out below:

| Ingredients | Analysis | lbs./ton |
|---|---|---|
| Single Superphosphate | 20% APA | 637 |
| Triple Superphosphate | 46% APA | 158 |
| Muriate of Potash | 60% $K_2O$ | 334 |
| Ammonium Sulfate | 20.5% N | 637 |
| Liquid Anhydrous Ammonia | 82.2% N | 84 |
| Sulfuric Acid (60° Bé.) | | 200 |

In each of these two tests, the four initially dry ingredients listed in the above operating formula were premixed in a pug mill at the rate of 4.95 pounds per minute (p.p.m.). To the dry feed entering the pug mill was added .566 p.p.m. of 60° Bé. sulfuric acid to produce a highly acid solids-liquid mixture (material only slightly dampened) which then entered the rotating inclined tube at its upper or feed end and traveled toward its lower or outlet end. In the first of these tests liquid anhydrous ammonia was introduced into the chamber containing the tumbling solids at a point 39 inches from the feed end of the tube. Here a reaction ensued whereby normal ammonium sulfate was formed "in situ." Sufficient ammonia was provided to convert all $H_2SO_4$ to $(NH_4)_2SO_4$ and also ammoniate the superphosphates at the rate of 3 pounds of $NH_3$ per unit of APA (20 lbs. available $P_2O_5$). The steam evolved by the neutralization reaction heat between the ammonia and acidic substance was allowed to travel concurrently with the solids through the inclined tube to exit at the lower or discharge end.

In the second of this series of tests, the dry ingredients were mixed and acidified in precisely the same fashion and in identical quantities. As previously, the mixture was removed from the pug mill and charged into the inclined rotary mixer at the upper or feed end. However, the mixture was tumbled and cascaded toward the lower end in a direction countercurrent to that of the air draft, the latter entering the discharge end of the mixer at a rate of approximately 100 f.p.m. Further, the liquid anhydrous ammonia entered at a point 32¾ inches from the outlet end. The countercurrently flowing stream of ammonia gas (resulting from vaporization of the liquid anhydrous by virtue of flash evaporation together with the vaporization caused by contact with the hot neutralized solids) encountered the acidic material at the feed end of the mixer to form "in situ" normal ammonium sulfate and ammoniated superphosphate. This reaction is entirely analogous to that of the previously discussed run conducted under concurrent flow conditions. The operating results and product characteristics observed in each case are set out in tabular form below:

|  | Concurrent Run | Countercurrent Run |
| --- | --- | --- |
| Product temp. at tube discharge end_____° F__ | 136 | 94 |
| Free moisture content of product (Desiccator method-anhydrone)_____percent__ | 2.65 | 1.67 |
| Moisture shrink-based on amt. of water entering system_____do____ | 37.4 | 61.7 |
| Product screen analysis: |  |  |
| Larger than 6 mesh_____do____ | 14.9 | 6.1 |
| 6 to 40 mesh_____do____ | 46.8 | 75.4 |
| Smaller than 40 mesh_____do____ | 38.3 | 18.5 |

The tests indicate that by the application of this invention, it is possible to secure well granulated fertilizers containing appreciable quantities of fixed nitrogen. Further, the nitrogen containing fertilizer solids emerge both cool and dry and after but a 5-10 minute passage through a rotary mixing shell. In fact, the injection of increased quantities of acid and alkali into the kiln, so as to supply larger percentages of fixed nitrogen in the product, results in an increasingly cool product. Since the solids are at a constant temperature, 220-230° F., when they first contact liquid anhydrous ammonia, regardless of the violence of the acid-alkali reaction, injection of greater quantities of ammonia at −28° F. must necessarily abstract additional heat. Only by cooling in stages and taking full advantage of water's cooling potential before employing liquid anhydrous is such a result possible.

Mineral acids other than sulfuric or phosphoric, e.g., nitric, suitably react with ammonia to form nitrogen-containing salts. As indicated earlier, it may be desirable to employ an acid salt rather than the acid itself. For example, acid ammonium sulfate reacts readily with ammonia to form normal ammonium sulfate and may be preferable to the acid itself since the former will not attack potassium chloride, ammonium nitrate and dolomite as rapidly as the concentrated acid. Additionally, certain other salts, e.g., ammonium sulfate, nitrate and phosphate, may be employed in mixed goods as sources of nitrogen over and above those formed in the mixer by ammoniation of the superphosphate and reaction of ammonia and acid. Other fertilizer ingredients, such as dolomite or limestone, organic materials, such as tankages, leather scraps, tobacco stems, etc., and finally fillers, such as sand, may be included in the mixed goods.

It is of course, equally possible to employ the process of this invention in the manufacture of a single relatively pure salt. A preformed ammonium salt is initially charged into the tumbling solids reaction zone. The mineral acid is selected so that its interaction with ammonia will yield more of the same salt previously charged into the mixing tube. The reaction proceeds in the usual fashion and at the discharge end of the tube the emerging salt is split into product and recycle streams or screened to yield a narrow size fraction product and fines, the latter being reintroduced into the inclined tube at the charging end. In such a process, the recycled volume is generally between three and ten times as large as that portion not recycled. If sulfuric acid is selected, the salt produced is ammonium sulfate while the reaction of ammonia and phosphoric acid yields mono-ammonium phosphate ($NH_4H_2PO_4$).

It is also within the scope of this invention to employ two or more short kilns in each of which one or more operations may be performed rather than completing the nitrogen salt formation, final cooling and granulation in a single mixing shell.

Obviously, many modifications and variations of the invention as hereinbefore set forth may be made without departing from the spirit and scope thereof, and therefore only such limitations should be imposed as are indicated in the appended claims.

I claim:

1. A continuous countercurrent process for the manufacture of mixed phosphatic fertilizer, which comprises charging fertilizer solids material containing acidic fertilizer ingredients into a first reaction zone, reacting said fertilizer solids in said first reaction zone with ammonia vapors from a second reaction zone to form reaction products thereby increasing the nitrogen content of said fertilizer ingredients, passing the fertilizer material including said reaction products to said second reaction zone, charging liquid anhydrous ammonia to said second reaction zone, contacting the fertilizer material with liquid anhydrous ammonia in said second reaction zone to cool the reaction products and to vaporize the ammonia, passing the vaporized ammonia from said second reaction zone to said first reaction zone, and discharging cooled mixed fertilizer from said second reaction zone.

2. A continuous countercurrent process for the manufacture of mixed phosphatic fertilizer, which comprises charging water and fertilizer material, including acidic ingredients selected from the group consisting of sulfuric acid, phosphoric acid, nitric acid, and ammonium acid sulfate, into a first reaction zone adjacent one end of an elongated reaction space, introducing anhydrous liquid ammonia into a second reaction zone adjacent the other end of said space, reacting said acidic ingredients with vapors of ammonia flowing from said second reaction zone thereby forming an ammonium salt and generating heat, vaporizing sufficient of said water to dissipate substantially said heat by the heat of vaporization of the evaporated water, passing the reaction products through said space countercurrent to said anhydrous ammonia to cool the said products, and discharging a cooled mixed fertilizer from the other end of said reaction space.

3. A continuous countercurrent process for the manufacture of mixed fertilizer, which comprises charging solid fertilizer materials, including superphosphate, to the charge end of an elongated reaction space, tumbling the fertilizer materials while in said space, charging acidic ingredients into said space adjacent the entrance of said fertilizer materials, charging anhydrous liquid ammonia into said space adjacent the discharge end thereof, reacting the acidic ingredients with vapors of said ammonia thereby forming an ammonium salt, passing the fertilizer materials containing said ammonium salt through said space countercurrent to said ammonia whereby the ammonia is vaporized and said material cooled, withdrawing vapors, including steam, from the charge end of said reaction space, and recovering a mixed fertilizer containing said solid fertilizer materials and ammonium salt from the discharge end of said space.

4. A continuous countercurrent process for the manufacture of mixed fertilizer containing calcium phosphate and nitrogen-containing compounds, which comprises treating phosphate rock with aqueous acid to produce a superphosphate, charging the superphosphate to the charge end of an elongated reaction space, contacting the superphosphate in said space with ammonia vapors flowing from the discharge end of said space to form monoammonium phosphate and to generate heat, dissipating the heat so formed by vaporizing the moisture in said aqueous acid, passing the reaction products in said space countercurrent to anhydrous ammonia to reduce the temperature to at least about 167° F. and to form diammonium phosphate, introducing liquid anhydrous ammonia adjacent the discharge end of said space to cool the mixed fetrilizer to at least about 120° F. to prevent reversion of the superphosphate, discharging cooled mixed fertilizer from the discharge end of said reaction space, and withdrawing vapors from the reaction space adjacent the charge end thereof.

5. The process of claim 4 wherein the aqueous acid is sulfuric acid of about 60° Bé.

References Cited in the file of this patent

UNITED STATES PATENTS

| | | |
|---|---|---|
| 1,907,438 | Ober | May 9, 1933 |
| 1,930,883 | Oehme | Oct. 17, 1933 |
| 1,949,129 | Oehme | Feb. 27, 1934 |
| 1,980,008 | Shoeld | Nov. 6, 1934 |
| 2,077,171 | Harvey et al. | Apr. 13, 1937 |
| 2,136,793 | Gabeler et al. | Nov. 15, 1938 |
| 2,618,547 | Davenport | Nov. 18, 1952 |
| 2,680,680 | Coleman | June 8, 1954 |
| 2,729,554 | Nielsson | Jan. 3, 1956 |